(12) United States Patent
Baek

(10) Patent No.: US 9,257,688 B2
(45) Date of Patent: Feb. 9, 2016

(54) BATTERY PACK HAVING AN INNER FRAME AND AN OUTER FRAME

(75) Inventor: Woon-Seong Baek, Suwon-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 1182 days.

(21) Appl. No.: 12/926,154

(22) Filed: Oct. 28, 2010

(65) Prior Publication Data
US 2011/0129699 A1 Jun. 2, 2011

(30) Foreign Application Priority Data
Nov. 30, 2009 (KR) .................. 10-2009-0116669

(51) Int. Cl.
*H01M 2/02* (2006.01)
*H01M 2/10* (2006.01)
*H01M 10/04* (2006.01)
*H01M 10/42* (2006.01)

(52) U.S. Cl.
CPC .......... *H01M 2/1061* (2013.01); *H01M 2/0207* (2013.01); *H01M 2/0267* (2013.01); *H01M 10/0436* (2013.01); *H01M 10/425* (2013.01)

(58) Field of Classification Search
CPC ................. H01M 2/02–2/0217; H01M 2/0267
USPC ......................................... 429/177–179, 163
See application file for complete search history.

(56) References Cited

U.S. PATENT DOCUMENTS

| 2003/0082441 A1* | 5/2003 | Hovi et al. ................ 429/123 |
| 2005/0112415 A1 | 5/2005 | Takeshita et al. |
| 2008/0261087 A1 | 10/2008 | Jang et al. |
| 2009/0081485 A1 | 3/2009 | Heo |
| 2009/0081539 A1 | 3/2009 | Koh et al. |
| 2009/0111017 A1* | 4/2009 | Kim ............................ 429/178 |
| 2009/0111018 A1 | 4/2009 | Park et al. |

FOREIGN PATENT DOCUMENTS

| CN | 101393996 A | 3/2009 |
| CN | 101425601 A | 5/2009 |
| EP | 2056374 A1 | 5/2009 |
| JP | 2005-142153 A | 6/2005 |
| JP | 2007-157452 A | 6/2007 |
| JP | 2009-110955 A | 5/2009 |
| KR | 10-2005-0037366 A | 4/2005 |

(Continued)

OTHER PUBLICATIONS

European Search Report in EP 10191473.7-2119, dated Mar. 31, 2011 (Baek).

(Continued)

*Primary Examiner* — Jonathan G Leong
(74) *Attorney, Agent, or Firm* — Lee & Morse, P.C.

(57) ABSTRACT

A battery pack including a bare cell, the bare cell having a pair of first side portions opposite to each other, a pair of second side portions opposite to each other, and a pair of plane portions opposite to each other, the second side portions and the plane portions being connected to ends of the first side portions; a protection circuit module electrically connected to the bare cell; an inner frame between the bare cell and the protection circuit module, the inner frame accommodating the bare cell and exposing one side portion of the pair of first side portions; and an outer frame, the outer frame accommodating the bare cell, the protection circuit module, and the inner frame and exposing the pair of plane portions.

12 Claims, 4 Drawing Sheets

(56) References Cited

FOREIGN PATENT DOCUMENTS

| KR | 10-2007-0075707 A | 7/2007 |
|---|---|---|
| KR | 10-2007-0108800 A | 11/2007 |
| KR | 10-2009-0031158 A | 3/2009 |
| KR | 10 2009-0075396 A | 7/2009 |

OTHER PUBLICATIONS

Chinese First Office Action in CN 201010564641.1, dated Dec. 14, 2012, with English translation (Baek).

Korean Office Action in KR 10-2009-0116669 A, dated Apr. 25, 2011 (Baek).

Korean Office Action in KR 10-2009-0116669, dated Dec. 14, 2011 (Baek).

Chinese Second ($2^{nd}$) Office Action in CN 201010564641.1, dated Aug. 13, 2013, including Chinese Search Report dated Aug. 5, 2013, with English translation (Baek).

Japanese Office Action in JP 2010-037259, dated Aug. 14, 2012 (Baek).

* cited by examiner

BATTERY PACK HAVING AN INNER FRAME AND AN OUTER FRAME

BACKGROUND

1. Field

Embodiments relate to a battery pack.

2. Description of the Related Art

As the development of and demand for mobile devices have recently increased, demands on secondary batteries have been rapidly increased as energy sources.

Battery packs are generally classified into, e.g., a hard battery pack and an inner battery pack, based on how a secondary battery is mounted in a device. Among them, the inner battery pack may be mounted in an external device, and then hidden by a cover, which may form a part of the external device. Therefore, it may be inconvenient to mount the inner battery pack in the external device. However, it may be easy to design the inner battery pack, and the inner battery pack may have high compatibility with the external devices.

Battery packs may be manufactured in various shapes in accordance with customers' demands on their appearances. Recently, development of battery packs that are easy to assemble and maintain a shape have been desired.

SUMMARY

Embodiments are directed to a battery pack, which represents advances over the related art.

It is a feature of an embodiment to provide a battery pack capable of simplifying manufacturing processes by enhancing shape matching when components in the battery pack are assembled.

At least one of the above and other features and advantages may be realized by providing a battery pack including a bare cell, the bare cell having a pair of first side portions opposite to each other, a pair of second side portions opposite to each other, and a pair of plane portions opposite to each other, the second side portions and the plane portions being connected to ends of the first side portions; a protection circuit module electrically connected to the bare cell; an inner frame between the bare cell and the protection circuit module, the inner frame accommodating the bare cell and exposing one side portion of the pair of first side portions; and an outer frame, the outer frame accommodating the bare cell, the protection circuit module, and the inner frame and exposing the pair of plane portions.

An electrode terminal may be disposed on one of the pair of second side portions.

The outer frame may be integrally formed as a single body.

The battery pack may further include at least one corresponding pair of connecting members, the connecting members being respectively disposed on corresponding regions of an outside of the inner frame and an inside of the outer frame and coupled to each other.

The connecting members may include at least one protruding portion on an outside of the inner frame, the protruding portion being disposed adjacent to at least one of the second side portions of the bare cell, and at least one groove portion on an inside of the outer frame, the groove portion corresponding to the protruding portion.

The connecting members may include at least one groove portion on an outside of the inner frame, the groove portion being disposed adjacent to at least one of the second side portions of the bare cell, and at least one protruding portion on an inside of the outer frame, the protruding portion corresponding to the groove portion.

The connecting members may include at least one protruding portion respectively disposed on at least one end of the inner frame, and at least one groove portion respectively disposed on an inside of the outer frame, the groove portion corresponding to the protruding portion.

The connecting members may include at least one groove portion disposed on at least one end of the inner frame, and at least one protruding portion disposed on an inside of the outer frame, the protruding portion corresponding to the groove portion.

The connecting members may include a protruding portion, the protruding portion having a round shape.

The connecting members may include a protruding portion and a groove portion, the protruding portion being fitted into the groove portion.

The inner frame may expose the pair of plane portions of the bare cell, and may include at least one pair of ribs disposed opposite to each other and extending along the pair of plane portions of the bare cell.

The inner frame may include at least one projection extending perpendicularly to the plane portions of the bare cell, the at least one projection being disposed on the inner frame adjacent to the first side portion of the bare cell, and the outer frame may include at least one hole corresponding to the at least one projection.

The protection circuit module may be disposed on an outer surface of the inner frame.

The inner frame and the protection circuit module may be welded to each other.

The inner frame and the protection circuit module may be attached to each other by insulating tape therebetween.

The inner and outer frames may each be formed of at least one of polycarbonate (PC), polyethylene terephthalate glycol (PETG), polyethylene (PE), polypropylene (PP), and acrylonitrile-butadiene-styrene (ABS).

The battery pack may further include a taping member surrounding an outside of the bare cell and the outer frame.

The taping member may be formed from a shrinkable tube.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Korean Patent Application No. 10-2009-0116669 filed on Nov. 30, 2009, in the Korean Intellectual Property Office, and entitled: "Battery Pack," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. In addition, it will also be understood that when an element is referred to as being "between" two elements, it can be the only element between the two elements, or one or more intervening elements may also be present. Like reference numerals refer to like elements throughout.

When an element is referred to as being "connected to" another element, it can be directly connected to the another element or be indirectly connected to the another element with one or more intervening elements interposed therebetween.

Figure 1:
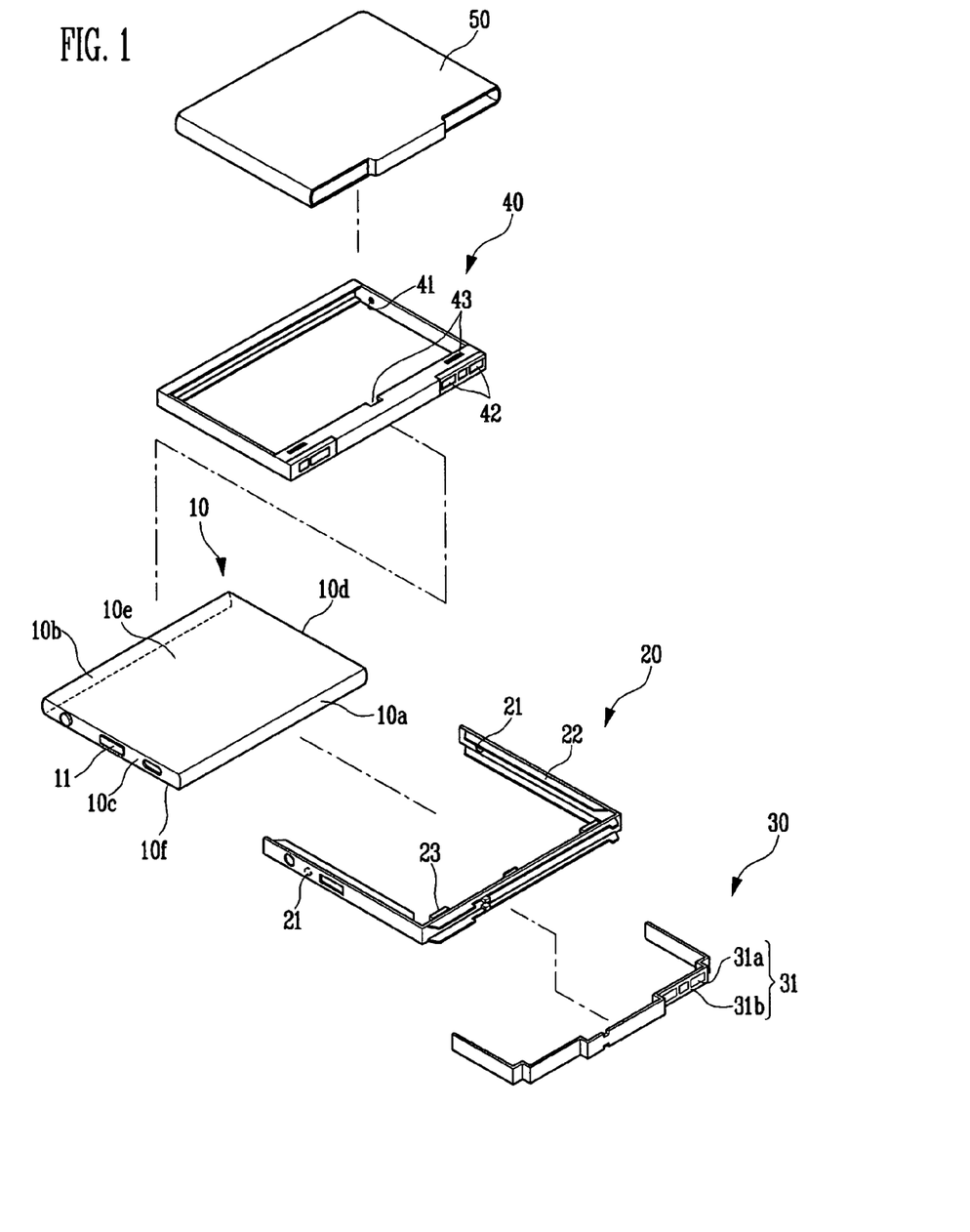
FIG. 1 illustrates an exploded perspective view of a battery pack according to an embodiment.

FIG. 1 illustrates an exploded perspective view of a battery pack according to an embodiment.

Referring to FIG. 1, the battery pack of an embodiment may include a bare cell 10 having an electrode assembly (not illustrated) and a can or pouch surrounding an outer circumferential surface of the electrode assembly; a protection circuit module 30 electrically connected to the bare cell 10; a "U" shaped inner frame 20; and a rectangularly shaped outer frame 40.

The bare cell 10 may have a pair of first side portions 10a and 10b opposite to each other; a pair of second side portions 10c and 10d connected to end portions of the first side portions 10a and 10b and opposite to each other; a pair of plane portions 10e and 10f opposite to each other; and an electrode terminal 11 exposed on one of the second side portions 10c. The inner frame 20 may be formed in a "U" shape to expose one first side portion 10b of the pair of first side portions 10a and 10b and the pair of plane portions 10e and 10f. The protection circuit module 30 may be mounted on an outside of the inner frame 20. In other words, the protection circuit module may be on an outer edge of the inner frame 20 adjacent to the first side portion 10a. In an implementation, the inner frame 20 and the protection circuit module 30 may be attached to each other by, e.g., welding or insulating tape.

The outer frame 40 may be formed in a hollow rectangular shape to expose the pair of plane portions 10e and 10f while accommodating the bare cell 10, the protection circuit module 30, and the inner frame 20. The inner and outer frames 20 and 40 may be connected to each other by at least one connecting member having an, e.g., interengaging, protruding portion 21 and a groove portion 41, respectively. The protruding portion 21 may be formed on an outside of the inner frame 20, adjacent to at least one of the second side portions 10c and 10d of the bare cell 10. The groove portion 41 may be formed on an inside of the outer frame 40 to correspond to the protruding portion 21. Thus, the inner and outer frames 20 and 40 may be connected to each other by, e.g., forcibly, fitting the protruding portion 21 into the groove portion 41. The outer frame 40 may include a terminal exposing portion 42. The terminal exposing portion 42 may allow an external input/output terminal portion 31, which will be described below, to be exposed outside of the outer frame 40.

In the present embodiment, the structure has been described in which the protruding portion 21 and the groove portion 41 are formed on the inner frame 20 and the outer frame 40, respectively. In an alternative implementation, the inner and outer frames 20 and 40 may be connected to each other by, e.g., connection of a groove portion formed on an outside of the inner frame 20 and a protruding portion formed on an inside of the outer frame 40 to correspond to the groove portion.

The inner frame 20 may also include ribs 22 extending toward, i.e., along, the plane portions 10e and 10f of the bare cell 10 from at least one pair of sides opposite to each other in the inner frame 20. Accordingly, the bare cell 10 may be fixed to the inner frame 20 without a separate adhesive member.

The electrode terminal 11 may be disposed on one second side portion 10c of the second side portions 10c and 10d of the bare cell 10. The electrode terminal 11 may be electrically connected to the protection circuit module 30. The inner frame 20 may be disposed between the bare cell 10 and the protection circuit module 30 such that portions of the bare cell 10 except for the electrode terminal 11 are isolated from the protection circuit module 30. The protection circuit module 30 may include an electrical connection terminal (not illustrated) to electrically connect with the electrode terminal 11 of the bare cell 10. The protection circuit module 30 may further include an external input/output terminal portion 31 on the electrical connection terminal.

As described above, the rectangular shaped outer frame 40 forming a portion of a profile of the battery pack may be coupled to the bare cell 10 that is electrically connected to the protection circuit module 30 with the "U" shaped inner frame 20 interposed therebetween. In an implementation, the bare cell 10 and an outside of the outer frame 40 may be surrounded by a taping member 50, thereby reinforcing a joint between the bare cell 10 and the outer frame 40.

A projection 23 and a hole 43 will be described in a more detailed manner with reference to FIGS. 3 and 4.

Referring to FIGS. 2 to 5, an assembled state of the battery pack according to the present embodiment will be described in a more detailed manner.

Figure 2:
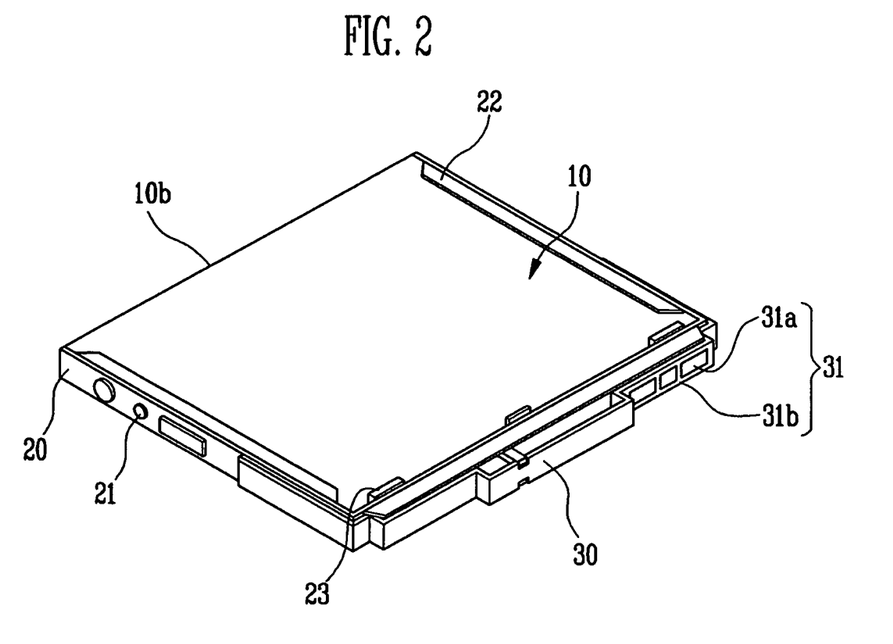
FIG. 2 illustrates a perspective view of an assembled state of a bare cell and an inner frame according to an embodiment.

FIG. 2 illustrates a perspective view of the assembled state of the bare cell and the inner frame according to the present embodiment.

Referring to FIG. 2, the inner frame 20 may expose one first side portion 10b of the pair of first side portions 10a and 10b as well as the pair of plane portions 10e and 10f in the bare cell 10. That is, the inner frame 20 may be disposed on the outside of the bare cell 10 so as to surround the pair of second side portions 10c and 10d and one first side portion 10a of the pair of first side portions 10a and 10b of the bare cell 10. The ribs 22 may extend along the plane portions 10e and 10f of the bare cell 10 from at least one pair of sides opposite to each other in the inner frame 20. Accordingly, the bare cell 10 may be fixed to the inner frame 20 without a separate adhesive member. In an implementation, four ribs 22 may extend along the plane portions 10e and 10f of the bare cell 10 from the sides at which the pair of second side portions 10c and 10d of the bare cell 10 contact the inner frame 20. However, in an alternative implementation, ribs 22 may extend along the plane portions 10e and 10f of the bare cell 10 from, e.g., one or three pairs of sides opposite to each other in the inner frame 20 (see FIG. 1).

At least one, e.g., round-shaped, protruding portion 21 may be disposed on a portion of the outside of the inner frame 20 adjacent to at least one of the second side portions 10c and 10d of the bare cell 10. Thus, when assembling the battery pack, the protruding portion 21 may be connected to the groove portion 41 disposed inside of the outer frame 40, such that the inner and outer frames 20 and 40 may be easily assembled. Accordingly, it is possible to enhance shape matching, i.e., ensure a tight fit, when the inner and outer frames 20 and 40 are assembled.

The bare cell 10 will be briefly described. The bare cell 10 may be, e.g., a can-type bare cell or pouch-type bare cell. In the present embodiment, the can-type bare cell will be described as an example of the bare cell 10.

The bare cell 10 may include an electrode assembly and a can for accommodating the electrode assembly. The electrode assembly may include a positive electrode plate having surfaces coated with a positive electrode active material, a separator, and a negative electrode plate having surfaces coated with a negative electrode active material. Electrode tabs may be coupled to regions extending from the positive and negative electrode plates, respectively. One of the electrode tabs may be connected to the can or a cap plate. The other of the electrode tabs may be connected to the electrode terminal 11 (see FIG. 1) so as to be electrically connected to the protection circuit module 30.

The protection circuit module 30 may be seated on the outside of the inner frame 20. In an implementation, the protection circuit module 30 may be attached to the inner frame 20 by, e.g., welding or insulating tape. As such, the assembled form of the bare cell 10 and the protection circuit module 30 may be referred to as a core pack. Therefore, in the following description, the term "core pack" will be used as the assembled form of the bare cell 10, the inner frame 20, and the protection circuit module 30.

The protection circuit module 30 may be physically and electrically connected to the electrode terminal 11 of the bare cell 10. The protection circuit module 30 may include a printed circuit board (not illustrated). The printed circuit board may include a protection circuit, e.g., a circuit for controlling charge and discharge of a battery to have a uniform charge state and/or a circuit for preventing overdischarge and overcharge. The protection circuit module 30 may include a protection element, e.g., a thermistor or temperature fuse. When a voltage or current of a battery are higher than a predetermined voltage or current due to, e.g., high temperature or overcharge/overdischarge of the battery, the protection element may cut off the current, so that it is possible to prevent, e.g., explosion and/or fire, in the battery. The protection circuit module 30 may have an electrical connection terminal (not illustrated) to allow the electrode tabs of the bare cell 10 to be electrically connected to the printed circuit board.

The protection circuit module 30 may transmit and receive electrical signals between the bare cell 10 and an external device (not shown). Accordingly, the protection circuit module 30 may further include, e.g., the external input/output terminal 31 on the electrical connection terminal. The external input/output terminal 31 may serve as an electrical medium between the protection circuit module 30 and the external device. The external input/output terminal portion 31 may include metal portions 31a and a housing portion 31b surrounding the metal portions 31a. The metal portions 31a may be plated with, e.g., gold (Au) or another conductive material, so as to allow electrical signals to be transmitted/received between the bare cell 10 and the external device. The housing portion 31b may be made of, e.g., plastic or other insulating material, so that the metal portions 31a spaced apart from each other at a predetermined interval in the housing portion 31b may be isolated from each other.

Figure 3:
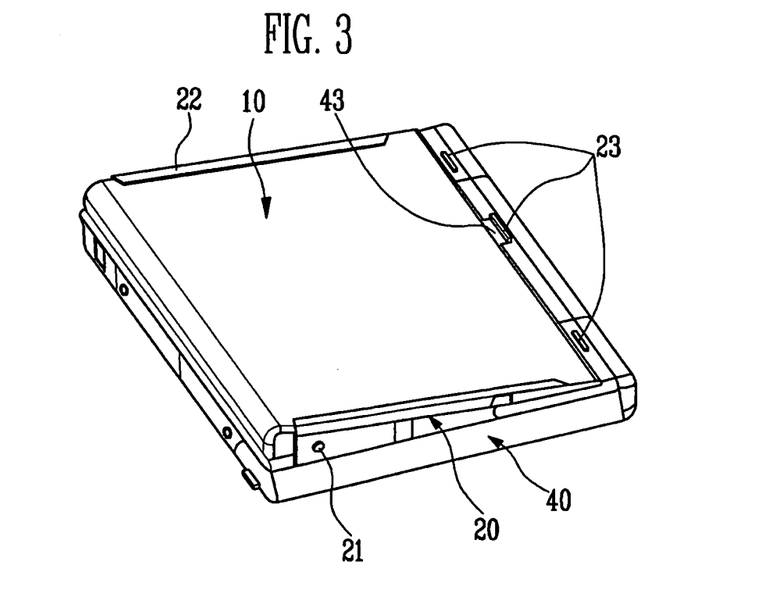
FIG. 3 illustrates a perspective view of a state of assembly just before a core pack and an outer frame are assembled according to an embodiment.

FIG. 3 illustrates a perspective view of a state of assembly just before the core pack and the outer frame are assembled. FIG. 4 illustrates a perspective view of the protruding portion of the inner frame and the groove portion of the outer frame.

Figure 4:
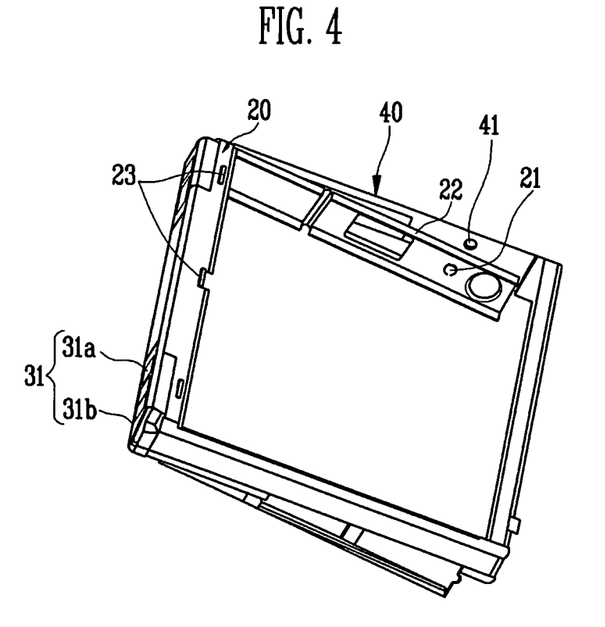
FIG. 4 illustrates a perspective view of a protruding portion of the inner frame and a groove portion of the outer frame according to an embodiment.

Referring to FIGS. 3 and 4, the inner frame 20 may be formed in a "U" shape to expose the pair of plane portions 10e and 10f and one first side portion 10b of the first side portions 10a and 10b of the bare cell 10. The outer frame 40 may accommodate the bare cell 10, the protection circuit module 30, and the inner frame 20. The outer frame 40 may be formed in a hollow rectangular shape to expose the pair of plane portions 10e and 10f of the bare cell 10.

The protruding portion 21 may be disposed on the outside of the inner frame 20 adjacent to where the inner frame 20 contacts each of the second side portions 10c and 10d of the bare cell 10. The groove portion 41 may be disposed on the inside of the outer frame 40. The protruding portion 21 and the groove portion 41 may be disposed at positions corresponding to each other so that the protruding portion 21 may be, e.g., forcibly, fitted into the groove portion 41. In other words, the protruding portion 21 and the groove portion 41 may have interengaging, matching shapes. In an implementation, the protruding portion 21 may have, e.g., a round shape. Therefore, interference may be temporarily generated by pressure applied when the inner and outer frames 20 and 40 are assembled so that the protruding portion 21 may be fitted into the groove portion 41. That is, when the core pack is inserted into the outer frame 40, the protruding portion 21 of the inner frame 20 may be connected to the groove portion 41 of the outer frame 40, and therefore, the core pack and the outer frame 40 may be assembled in an exact predetermined position or configuration, thereby completing the battery pack. Here, the rectangular shaped outer frame 40 and the "U" shaped inner frame 20 may be assembled to have a shape that meets desired dimensions of the battery pack.

Projections 23 positioned vertical to, i.e., perpendicular to, the plane portions 10e and 10f of the bare cell 10 may be formed on a side of the inner frame 20 adjacent to the first side portion 10a of the bare cell 10. Holes 43 may be formed on the outer frame to correspond to the projections 23. Thus, the inner and outer frames 20 and 40 may be firmly assembled, i.e., tightly fitted together.

The inner frame 20 may isolate the bare cell 10 from the protection circuit module 30. The outer frame 40 may maintain a shape and strength of the battery pack. The inner and outer frames 20 and 40 may be formed of, e.g., polycarbonate (PC), polyethylene terephthalate glycol (PETG), polyethylene (PE), polypropylene (PP), and/or acrylonitrile-butadiene-styrene (ABS). Accordingly, the inner and outer frames 20 and 40 may be easily joined with the bare cell 10 by a slight elastic force from the aforementioned material when they are assembled.

Figure 5:
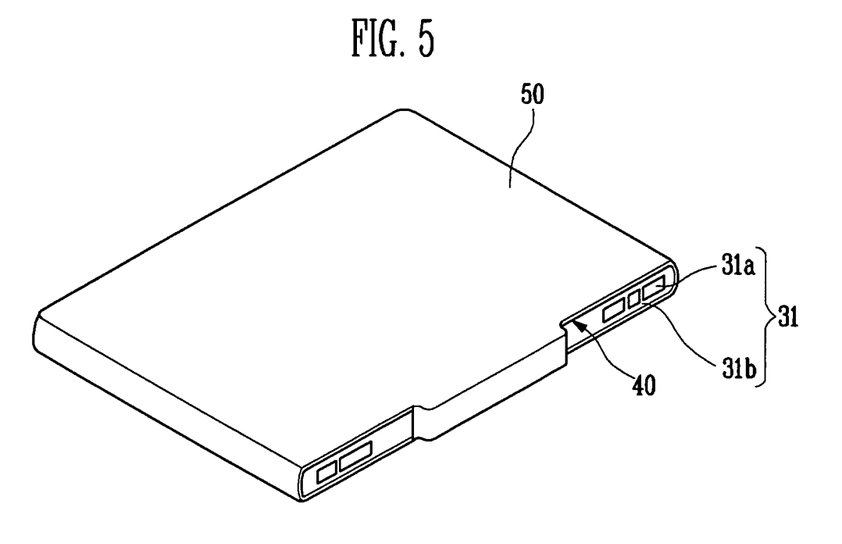
FIG. 5 illustrates a perspective view of a battery pack according to another embodiment.

FIG. 5 illustrates a perspective view of a battery pack according to another embodiment.

Referring to FIG. 5, after a core pack is inserted into a rectangular shaped outer frame 40, a taping member 50 may surround the outside of the assembled core pack and outer frame 40. The taping member 50 may reinforce the assembled core pack and the outer frame 40. In an implementation, the taping member 50 may partially surround only a connection portion between the outer frame 40 and the core pack. In another implementation, the taping member 50 may have the shape of a single sheet that surrounds an entire outer surface of the outer frame 40 and the core pack. However, the shape of the taping member 50 is not particularly limited.

The taping member 50 may be, e.g., a label for packaging, on which the discharge capacity of a secondary battery, its manufacture date, and the like, may be printed. In addition, the taping member 50 may, e.g., protect and/or insulate the battery pack. The material of the label for packaging may include, e.g., synthetic resin, paper, and the like, which are generally used as packaging materials. Preferably, a shrinkable tube is used as the material of the label for packaging.

Figure 6:
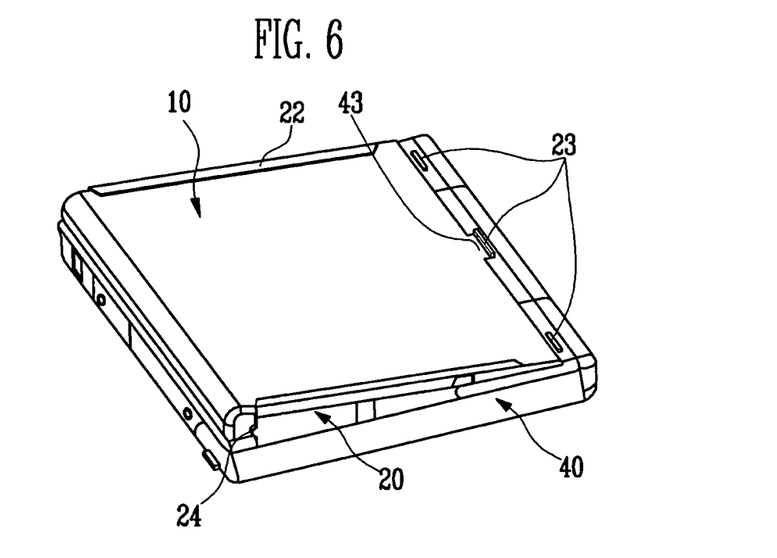
FIG. 6 illustrates a perspective view of a state of assembly just before a core pack and an outer frame are assembled according to another embodiment.
Figure 7:
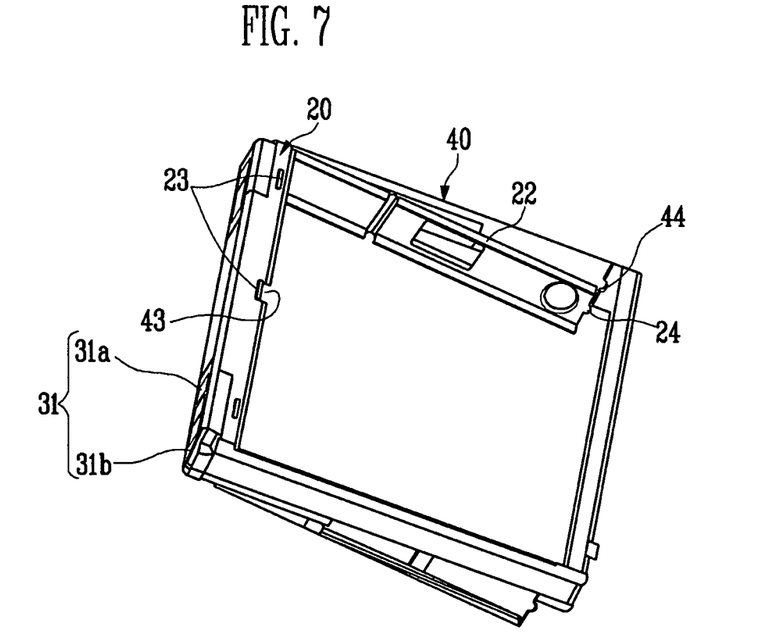
FIG. 7 illustrates a perspective view of a protruding portion of an inner frame and a groove portion of the outer frame according to another embodiment.

FIG. 6 illustrates a perspective view of a state of assembly of the battery pack just before a core pack and an outer frame are assembled. FIG. 7 illustrates a perspective view of protruding portions of the inner frame and groove portions of the outer frame of the battery pack of an embodiment.

Referring to FIGS. 6 and 7, the battery pack of the present embodiment may have the same configuration as the battery pack described above with reference to FIGS. 1 to 4. However, positions of protruding portions 24 and groove portions 44 in the battery pack of the embodiment may be different from those of the battery pack described above with reference to FIGS. 1 to 4.

That is, the inner frame 20 of the present embodiment may be formed in a "U" shape to expose the pair of plane portions 10e and 10f and one first side portion 10b of the pair of side portions 10a and 10b of the bare cell 10. The outer frame 40 may accommodate a core pack formed as described above, and may be formed in a rectangular shape to expose the pair of plane portions 10e and 10f of the bare cell 10. The inside of the rectangularly shaped outer frame 40 and the outside of the "U" shaped inner frame 20 may have shapes corresponding to each other, allowing ease of fitting when the inner and outer frames 20 and 40 are assembled. The outer frame 40 connected to the core pack may have a shape that meets desired dimensions of the battery pack. In other words, the outer frame 40 may define the shape of the battery pack.

At least one protruding portion 24 may be formed on an end portion of the inner frame 20 adjacent to at least one of the second side portions 10c and 10d of the bare cell 10. The groove portion 44 may be formed at an inside of the outer frame 40. The protruding portion 24 and the groove portion 44 may be formed at positions corresponding to each other such that the protruding portion 24 may be, e.g., forcibly, fitted into the groove portion 44. In other words, the protruding portion 24 and the groove portion 44 may have interengaging, matching shapes. In an implementation, the protruding portion 24 may have, e.g., a round shape. Therefore, interference may be temporarily generated by pressure applied when the inner and outer frames 20 and 40 are assembled so that the protruding portion 24 may be fitted into the groove portion 44. That is, when the core pack is inserted into the outer frame 40, the protruding portion 24 of the inner frame 20 may be connected to the groove portion 44 of the outer frame 40, and therefore, the core pack and the outer frame 40 may be assembled at an exact, predetermined position, thereby completing the battery pack.

In the present embodiment, it has been described that the protruding portion 24 is formed on the inner frame 20 and the groove portion 44 is formed on the outer frame 40 to correspond to the protruding portion 24. However, in an alternative implementation, a groove portion may be formed on the inner frame 20 and a protruding portion may be formed on the outer frame 40 to correspond to the groove portion, such that the protruding portion and the groove portion may be connected to each other.

As described above, the protruding portion 24 and the groove portion 44 may be respectively formed at the inner and outer frames 20 and 40, thereby enhancing shape matching, i.e., ensuring a tight fit, when the inner and outer frames 20 and 40 are assembled. Accordingly, manufacturing processes may be simplified, thereby increasing the productivity of the battery pack. Further, the battery pack may be firmly fixed, thereby providing a competitive improvement.

By way of review, generally, an inner battery pack may include a bare cell that may be repeatedly charged and discharged; a protection circuit module electrically connected to the bare cell so as to control charge or discharge of the bare cell and to block a circuit when the bare cell is overcharged or overdischarged; a resin in a gap between the bare cell and the protection circuit module; and an outer frame for packing the bare cell, protection circuit module, and the resin so that the inner battery pack may be mounted in an external device.

In order to manufacture such a battery pack including an electrode lead and a PTC thermistor connected to a positive electrode and a negative electrode, respectively, a circuit protection module may be electrically connected to the lead and the PTC thermistor. Then, the protection circuit module and the bare cell may be mechanically fixed to each other by filling resin in the gap between the protection circuit module and the bare cell to fix the protection circuit module to the bare cell. The bare cell and the protection circuit module, which may be formed into a single body, may be packed by an outer frame configured to be mounted in an external device. Here, the outer frame may be integrally molded with the bare cell, the protection circuit module, and the resin using another resin.

As described above, in a battery pack according to an embodiment, a battery pack in which a "U" shaped inner frame may be disposed between a bare cell and a protection circuit module. In addition, a protruding portion and a groove portion may be respectively formed on the inner frame and a rectangular shaped outer frame surrounding a core pack such that the inner and outer frames may be easily assembled. Thus, shape matching, i.e., fit, may be enhanced when the inner and outer frames are assembled. Accordingly, manufacturing processes may be simplified, thereby increasing the productivity of the battery pack. Further, the battery pack may be firmly fixed, thereby improving competitive power.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A battery pack, comprising:
   a bare cell, the bare cell having a pair of first side portions opposite to each other, a pair of second side portions opposite to each other, and a pair of plane portions opposite to each other, the second side portions and the plane portions being connected to ends of the first side portions;
   a protection circuit module electrically connected to the bare cell;
   an inner frame between the bare cell and the protection circuit module, the inner frame covering the pair of second side portions and one side portion of the pair of first side portions to accommodate—the bare cell and exposing an entirety of the other side portion of the pair of first side portions;
   an outer frame, the outer frame accommodating the bare cell, the protection circuit module, and the inner frame and exposing the pair of plane portions; and
   at least one corresponding pair of connecting members, the connecting members being respectively on corresponding regions of an outside of the inner frame and an inside of the outer frame and coupled to each other such that the inner frame and the outer frame are directly connected to each other through the connecting members, wherein the connecting members include at least one protruding portion on an outside surface of the inner frame, the protruding portion being disposed adjacent to at least one of the second side portions of the bare cell and protruding in a direction away from the bare cell and perpendicular to the at least one of the second side portions, and at least one groove portion on an inside surface of the outer frame, the groove portion including an indentation in the inside surface of the outer frame corresponding to the protruding portion such that the protruding portion fits into the groove portion.

2. The battery pack as claimed in claim 1, wherein an electrode terminal is disposed on one of the pair of second side portions.

3. The battery pack as claimed in claim 1, wherein the outer frame is integrally formed as a single body.

4. The battery pack as claimed in claim 1, wherein the protruding portion has a round shape.

5. The battery pack as claimed in claim 1, wherein the inner frame:
   exposes the pair of plane portions of the bare cell, and
   includes at least one pair of ribs disposed opposite to each other and extending along the pair of plane portions of the bare cell.

6. The battery pack as claimed in claim 1, wherein:
   the inner frame includes at least one projection extending perpendicularly to the plane portions of the bare cell, the at least one projection being disposed on the inner frame adjacent to the first side portion of the bare cell, and
   the outer frame includes at least one hole corresponding to the at least one projection.

7. The battery pack as claimed in claim 1, wherein the protection circuit module is disposed on an outer surface of the inner frame.

8. The battery pack as claimed in claim 1, wherein the inner frame and the protection circuit module are welded to each other.

9. The battery pack as claimed in claim 1, wherein the inner frame and the protection circuit module are attached to each other by insulating tape therebetween.

10. The battery pack as claimed in claim 1, wherein the inner and outer frames are each formed of at least one of polycarbonate (PC), polyethylene terephthalate glycol (PETG), polyethylene (PE), polypropylene (PP), and acrylonitrile-butadiene-styrene (ABS).

11. The battery pack as claimed in claim 1, further comprising a taping member surrounding an outside of the bare cell and the outer frame.

12. The battery pack as claimed in claim 11, wherein the taping member is formed from a shrinkable tube.

* * * * *